United States Patent [19]

Kopecky

[11] Patent Number: 4,674,419

[45] Date of Patent: Jun. 23, 1987

[54] FURROW OPENER FOR SEEDER

[75] Inventor: Ivyl D. Kopecky, Ypsilanti, N. Dak.

[73] Assignee: Haybuster Manufacturing, Inc., Jamestown, N. Dak.

[21] Appl. No.: 848,699

[22] Filed: Apr. 4, 1986

Related U.S. Application Data

[62] Division of Ser. No. 632,056, Jul. 18, 1984, Pat. No. 4,607,581.

[51] Int. Cl.⁴ ............................................. A01C 5/00
[52] U.S. Cl. ........................................ 111/73; 111/86
[58] Field of Search .................. 111/6, 7, 73, 80, 85, 111/86; 172/699, 700, 727

[56] References Cited

U.S. PATENT DOCUMENTS

| 69,571 | 10/1867 | McSherry | 111/85 |
|---|---|---|---|
| 165,322 | 7/1875 | Garoutte | 111/85 |
| 909,991 | 1/1909 | Cole | 111/85 |
| 1,031,167 | 7/1912 | Bushnell | 111/86 |
| 1,473,297 | 11/1923 | Knight | 111/86 |
| 2,048,441 | 7/1936 | Feltman | 111/59 |
| 2,259,303 | 10/1941 | Ewerth | 111/85 |
| 2,439,743 | 4/1948 | McEwen | 111/7 |
| 2,713,836 | 7/1955 | Ajero | 111/80 |
| 2,889,788 | 6/1959 | Van Dorn | 111/80 |
| 2,924,189 | 2/1960 | McLeod | 111/80 |
| 3,122,111 | 2/1964 | Taylor, Sr. | 111/80 |
| 3,188,988 | 6/1965 | Peck | 111/7 |
| 3,797,418 | 3/1974 | Bridger, Jr. | 111/73 |
| 3,854,429 | 12/1974 | Blair | 111/7 |
| 4,129,082 | 12/1978 | Betulius | 111/7 |
| 4,417,530 | 11/1983 | Kopecky | 111/73 |
| 4,565,141 | 1/1986 | Kopecky | 111/7 |

FOREIGN PATENT DOCUMENTS

| 1140155 | 1/1969 | United Kingdom | 111/7 |
|---|---|---|---|
| 581901 | 11/1977 | U.S.S.R. | 111/86 |
| 906418 | 2/1982 | U.S.S.R. | 111/86 |

Primary Examiner—James R. Feyrer
Attorney, Agent, or Firm—Kinney & Lange

[57] ABSTRACT

A furrow opener shank for use with seeders has seed outlets and fertilizer outlets at the lower end thereof, and includes a sealer plate which will permit the depositing of anhydrous ammonia or liquid fertilizer in a deep furrow and which positively seals the furrow prior to depositing the seeds in the furrow. The sealer plate has wedges that form a pair of grooves or small furrows spaced laterally of the center line of the furrow to provide pockets for the seeds being deposited. The shank has dual outlets for seed at the lower end so that seed is deposited in each of the furrows that are being formed by the sealer plate to keep the seed separated from the fertilizer to insure good germination and rapid growth as well as insuring placement of the seed in regions that are most likely to have moist soil.

8 Claims, 4 Drawing Figures

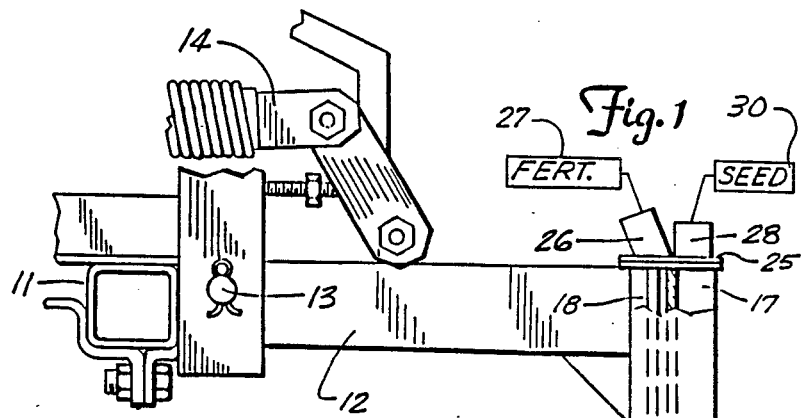
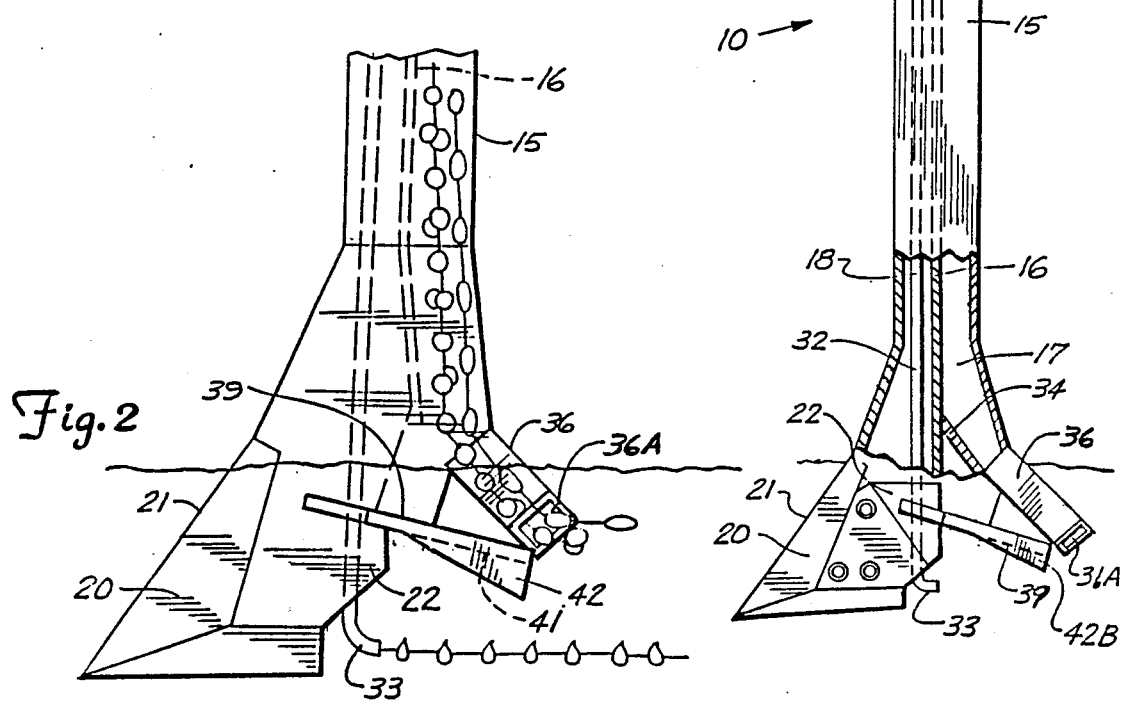
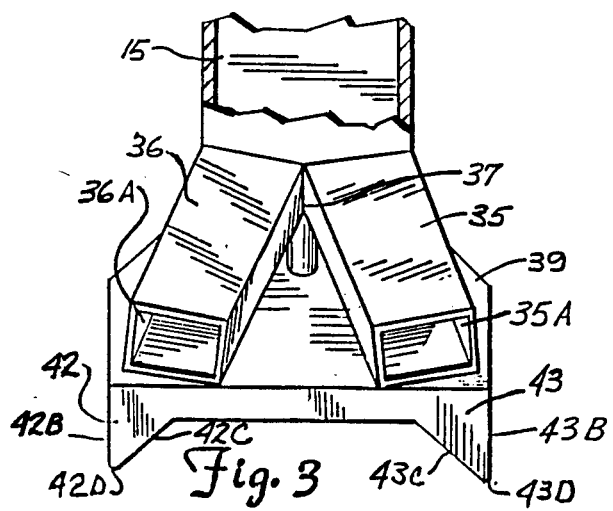
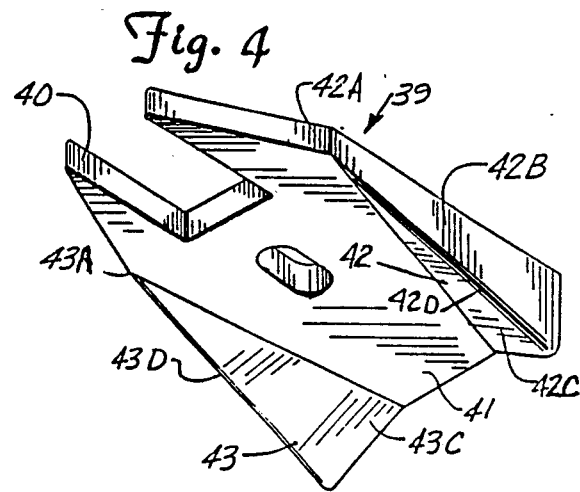

FURROW OPENER FOR SEEDER

This is a division of application Ser. No. 632,056, filed July 18, 1984, now U.S. Pat. No. 4,607,581.

BACKGROUND OF THE INVENTION

Reference is hereby made to U.S. patent application Ser. No. 563,198, filed Dec. 19, 1983 for Seeding Apparatus with Fertilizer applicator, now U.S. Pat. No. 4,565,141.

1. Field of the Invention

The present invention relates to a furrow opener for seeder that has dual outlet tubes for the seed and a positive sealing plate which also forms small furrows for receiving the seed.

2. Description of the Prior Art

Seed and fertilizer applicators are widely used at the present time. It has also been recognized that furrow opener shanks that have two vertical passageways can be utilized for applying seed and/or fertilizer in a furrow. For example, U.S. Pat. No. 4,417,530 shows a planting apparatus having a shank that deposits seeds through two different passageways in the shank and at two different depths. This patent also illustrates a dual outlet tube which places seed laterally of the center line of the shank in two separate paths to separate the seed from the furrow in which fertilizer will be deposited.

The prior art also shows devices such as that in U.S. Pat. No. 2,924,189 for planting at two different depths. U.S. Pat. No. 909,991 shows a grain drill shoe that has two passageways near the furrow opener, but does not have two individual fore and aft extending passageways for depositing material.

U.S. Pat. Nos. 2,889,788 and 2,048,441 also show furrow opener assemblies of interest, and these devices use two separate tubes for depositing material at different levels in the same furrow.

U.S. Pat. No. 3,122,111 shows an implement for sod seeding that has two different types of materials being deposited through a vertical shank, which includes a sealing and covering plate for pulverizing and packing the soil in the furrow and depositing seed on top of this pulverized soil. The particular shoe or blade has an opening at the rear which is shaped to permit a central portion of the pulverized soil to be built up in a type of a mound. The side portions of this shoe extend downwardly to intentionally build up this mound so that the rear slit builds this mound around the path of the seed that is being planted. The device makes grooves on opposite sides of the seed path, but the seed bed is the top or center of the formed mound on which the seed is deposited. The concept is to shave off the hard soil from the sides of the furrow and form a loose soil bed in the center portions of the furrow where the seed is deposited, so that the seed will rest on the center portion of the bed being formed.

SUMMARY OF THE INVENTION

The present invention relates to a furrow opener shank that has means for sealing a deep furrow for placement of liquid fertilizer, or if desired, granular fertilizer, and which includes a pair of diverging tubes primarily for dividing seed being planted into two paths, each path being along side the central line of the shank. A sealer plate is mounted ahead of and below the outlets from the diverging tubes for packing soil over the lowest part of the furrow in which the fertilizer has been deposited, and also forming two distinct grooves or small furrows at the outer sides of the main path for placement of the seeds from each of the diverging tubes so that the tubes deposit seeds into one of these furrows.

The shank assembly has an adapter plate at the top as shown in the aforementioned U.S. application Ser. No. 563,193 to permit applying a wide range of different combinations of seed and fertilizer, but it includes the unique sealer plate that packs material in toward the center and at the same time forms well defined furrows to receive the seeds and place it in the proper location.

BRIEF DESCRIPTION OF THE DRAWINGS

FIG. 1 is a side elevational view of a typical shank assembly having seed depositing means made according to the present invention;

FIG. 2 is a fragmentary enlarged side elevational view of the lower portion of the shank in FIG. 1;

FIG. 3 is a rear view of the device of FIG. 2; and

FIG. 4 is a perspective view of the furrow sealer plate and furrow former of the present invention.

DETAILED DESCRIPTION OF THE PREFERRED EMBODIMENTS

A seeder shank assembly indicated generally at 10 made according to the present invention is mounted onto a suitable support frame or tool bar 11, and has a rearwardly extending beam 12 that is mounted on a pivot pin 13 to clamp on the frame 11 and which has a spring trip control mechanism 14 of suitable and conventional design for maintaining the shank assembly into the ground. The beam 12 has a vertically extending furrow opener shank 15 fixed to the rear of the beam. The furrow opener shank in the form shown in FIGS. 1 through 3 defines a rectangular cross-section tube having an interior dividing wall 16 that extends vertically along its length to divide the shank into two chambers, comprising a first chamber 17 and a second chamber 18.

Reference is made to U.S. patent application Ser. No. 563,198, filed Dec. 19, 1983 for Seeding Apparatus With Fertilizer Spreader, assigned to the same assignee as this application which shows various combinations of seed and or fertilizer attachments that can be used with the present shank.

The vertical shank tube 15 has a furrow opener point of suitable design indicated at 20 fixed to its lower end, which will run below the level of the ground at a desired depth and will open a central furrow. The point 20 has a dividing edge 21 at its leading edge, and can be configured as desired to open an adequate furrow well below the ground. Additionally, spaced apart side plates 22 are provided along the sides of the furrow opening point 20.

In the form shown an adapter plate 25 is removably secured at the upper end of the shank tube 15 and includes an input tubular nipple 26 for receiving liquid or granular fertilizer from a source indicated generally at 27, and a second tubular nipple 28 for receiving seed from a source indicated at 30. The seeds and fertilizer can be metered as desired, and the fertilizer source 27 in the form shown is for liquid fertilizer discharged through a tube 32 down through provided openings to a lower tube end 33 below the surface of the ground and in the furrow that is opened. Granular fertilizer provided through passageway 18 will be discharged from a bottom opening defined at the lower end of the passageway, where tube 33 emerges from the shank.

At the rear of the shank tube 15, and at the lower end there is a tapered guide wall 34 joining the passageway or chamber 17. The guide wall leads to a pair of seed outlet tubes 35 and 36 which diverge in rearward direction, and have a common dividing edge 37 that is used for dividing seed from the passageway 17 into two paths, so that seed will come out through an outlet opening 35A from the tube 35, and from outlet opening 36A from the tube 36 (see FIG. 3). Immediately below these tubes 35 and 36 there is a sealer plate indicated at 39 that is supported on the shank 15, and fixed in position. The sealer plate 39 comprises a unitary cast plate that has a recess indicated at 40 which fits over the side plates 22 just to the rear of the opening point 20. The plate 39 and has a center surface 41 that is a flat surface as shown in FIG. 4, which tapers down slightly when mounted, as shown in FIGS. 1 and 2.

Adjacent to the outer lateral sides of the sealer plate 39, there are furrow opening wedge shaped portions indicated at 42 and 43, respectively, that extend downwardly from the surface 41 and which taper laterally and downwardly in rearward direction from a junction point indicated at 42A and 43A where the wedge portions also start expanding downwardly from surface 41. A narrower space is thus defined at the rear portions of the wedge portions as shown in FIG. 3. These wedge portions thus have outer side surfaces 42B and 43B which are vertically extending, and form planes that lie along the outer sides of the rear ends of the tubes 35 and 36. The inwardly facing surfaces as shown perhaps best in FIG. 4 indicated at 42C and 43C thus not only diverge downwardly but also diverge toward each other to tend to pack material to seal the opening formed by the furrow opener point for the liquid fertilizer at the end 33 of the tube 32 and for the granular fertilizer which is deposited at the lower end of passageway 18. The wedge shaped portions also form generally V-shaped grooves or auxiliary furrows spaced from opposite sides of the center line of the main shank and aligning with the outlet openings 35A and 36A.

Thus when seed comes down through the passageway 17 and is divided into the tubes 35 and 36, it will fall onto a very firm seed bed formed by the sealer plate 39 into the furrows formed by the wedge shaped portions 42 and 43 that taper downwardly in rearward direction, and also have facing surfaces that taper toward each other and toward the center line of the shank in rearward direction to form these furrows. The furrows substantially directly underlie the outlet openings 35A and 36A of the seed tubes 35 and 36.

Thus it can be seen that the sealer plate 39 will pack dirt into the opening left by the point 20, and cover the fertilizer issuing from the discharge end 33 of the liquid fertilizer tube 32, and at the same time, because the surfaces of the wedge shaped members taper not only downwardly along the edges 42D and 43D, but also the surfaces of the wedges taper toward each other in rearward direction and tend to pack material for a firm seed bed and also draw in material from the sides of the furrow formed. The soil is from farther out than the actual shank width, to provide moist soil in the seed bed for good germination. The plate 39 has vertical outer side surfaces 42B and 43B to define the outer sides of the furrows for seed.

Additionally, the sealing action seals in the fertilizer (either granular or liquid) and prevents direct contact of the seed with the fertilizer for rapid growth, good germination, and healthy plants throughout the plant life.

The present device thus provides a rugged shank, with the dual outlets for seed, and a sealer plate that includes furrow forming wedges that provide a seed bed and furrow for each of the outlets on opposite sides of the center line of the shank.

Although the present invention has been described with reference to preferred embodiments, workers skilled in the art will recognize that changes may be made in form and detail without departing from the spirit and scope of the invention.

What is claimed is:

1. An auxiliary furrow forming plate for an agricultural granular material applicator furrow opening shank include means for mounting the plate on a shank of a granular material applicator at a level adjacent the bottom of a main furrow formed by such shank when working, a major portion of said plate trailing such shank, said plate being below ground level when a shank on which the plate is mounted is at a working depth, said plate having wedge shaped side portions along opposite sides thereof, each wedge shaped side portion having a pair of wedge surfaces that converge downwardly and define edges where the converging surfaces meet that at least have portions that are laterally wider than a furrow opened by a shank mounting the plate, the defined edges being spaced downwardly from the main portion of the plate in rearward direction relative to direction of movement of the plate when working, one of the converging surfaces of each wedged shaped side portions facing a surface on the other wedge shaped side portion at a position below the plate, the first and second surfaces of each wedge shaped side portion diverging in rearward direction so the wedge shaped side portion are wider at their trailing ends, the wedge shaped side portions forming auxiliary furrows laterally of a shank on which the sealer plate is mounted at location below the ground, by packing the earth as the plate moves forwardly to provide a pair of firm beds at the rear of each of the wedge shaped side portions and into which granular material may be deposited.

2. An auxiliary earth working plate including means for mounting it on a shank of a seeder above the bottom of a main furrow formed by such shank when working, a major portion of said plate trailing such shank, means for positioning said plate below ground level when a shank on which the plate is mounted is at a working depth, said plate having wedge shaped side portions along opposite sides thereof, each wedge shaped side portion having a pair of wedge surfaces that converge downwardly in use and define edges where the converging surfaces meet that are to the exterior of a furrow opened by a shank mounting the plate, the defined edges also tapering downwardly in rearward direction relative to direction of movement of the plate when working, one of the converging surfaces of each wedge shaped side portion facing a surface on the other wedge shaped side portion and the facing surfaces tapering toward each other in rearward direction, the wedge shaped side portions forming small auxiliary furrows laterally of a shank on which the plate is mounted, at location below the ground, by packing the earth to provide a pair of firm seed beds at the rear of each of the wedge shaped side portions into which seed may be deposited.

3. The apparatus as specified in claim 2 wherein said wedge shaped side portions have substantially vertical outer side surfaces that extend substantially parallel to the direction of movement of the furrow opening shank through the soil, and the facing surfaces having portions adjacent the flat surface portion which taper from a maximum lateral width between the facing surfaces to a minimum lateral width between the facing surfaces in rearward direction.

4. The sealer plate of claim 2 wherein the forward end of said sealer plate has edge surfaces that taper toward each other from the outer sides of the wedge shaped side portions, and a recess at a forward end of said sealer plate of size to receive a portion of a shank on which the sealer plate is to be mounted, said edge surfaces joining the recess at the forward end of said sealer plate.

5. The apparatus of claim 4 wherein said sealer plate has a central substantially flat surface therein, and a slotted opening defined through said central flat surface at location rearwardly of the recess at the forward end of said sealer plate.

6. An auxiliary furrow forming plate for mounting onto the shank of a seeder, which shank opens a furrow having a first depth, said furrow forming plate including means for mounting the furrow forming plate on such shank for movement below ground level when a furrow is opened by such shank to the first depth, said plate having a leading end and a trailing end in use, said trailing end being wider than the leading end and said plate having side edges extending from the leading end to the trailing end, said plate further having a central downwardly facing substantially flat surface portion and a pair of depending auxiliary furrow forming portions adjacent the opposite lateral side edges thereof positioned on opposite sides of the flat surface portion, with the flat surface portion between said furrow forming portions, said furrow forming portions each having first and second surfaces that taper toward each other from a maximum spacing between the first and second surfaces of each furrow forming portion at the upper edges thereof to a furrow forming lower edge, the lower edges of said furrow forming portions being wider than and extending outside a furrow formed by a shank mounting the plate, and which lower edges further taper downwardly in direction toward the trailing end of the plate, and the first surface of each furrow forming portion facing the first surface of the other furrow forming portion, the upper edges of the first surfaces of the furrow forming portion extending along the central flat surface portion and tapering toward each other in rearward direction, the furrow forming portions thereby packing dirt to form a pair of spaced apart small auxiliary furrows each being a packed preformed bed laterally outwardly of a shank mounting the sealer plate for depositing granular materials thereinto.

7. The apparatus as specified in claim 6 wherein said depending furrow forming portions are wedge shaped, and have substantially vertical side surfaces on the outer sides thereof.

8. The apparatus as specified in claim 6 wherein said depending furrow forming portions have substantially vertical outer side surfaces forming the second surfaces that extend substantially parallel to the direction of movement of the sealer plate through the soil, and the facing first surfaces of the furrow forming portion having portions adjacent the central flat surface portion which taper from a maximum lateral width between the facing first surfaces to a minimum lateral width between the facing first surfaces in rearward direction.

* * * * *

UNITED STATES PATENT AND TRADEMARK OFFICE
CERTIFICATE OF CORRECTION

PATENT NO. : 4,674,419

DATED : June 23, 1987

INVENTOR(S) : Ivyl D. Kopecky

It is certified that error appears in the above-identified patent and that said Letters Patent is hereby corrected as shown below:

Column 4, line 36, cancel "sealer".

Column 5, line 15, cancel "sealer";

Column 5, line 19, cancel "sealer";

Column 6, line 18, cancel "sealer".

Claim 4 should read as follows:

>   The plate of Claim 2 wherein the forward end of said plate has edge surfaces that taper toward each other from the outer sides of the wedge shaped side portions, and a recess at a forward end of said plate of size to receive a portion of a shank on which the plate is to be mounted, said edge surfaces joining the recess at the forward end of said plate.

Signed and Sealed this

Tenth Day of November, 1987

Attest:

DONALD J. QUIGG

Attesting Officer

Commissioner of Patents and Trademarks